United States Patent [19]

Granryd

[11] 4,225,082

[45] Sep. 30, 1980

[54] LOW COST VEHICLE TRACTION DEVICE EMPLOYING PIVOTALLY MOUNTED ANCHORING MEANS

[76] Inventor: Thorvald G. Granryd, 825 N. Sheridan Rd., Lake Forest, Ill. 60045

[21] Appl. No.: 253

[22] Filed: Feb. 5, 1979

[51] Int. Cl.³ ............................................. E01B 23/00
[52] U.S. Cl. ...................................... 238/14; 152/171; 152/208; 188/32
[58] Field of Search ............................ 238/14; 188/32; 152/171, 172, 208

[56] References Cited

U.S. PATENT DOCUMENTS

| | | | |
|---|---|---|---|
| 3,279,700 | 10/1966 | Britschgi | 238/14 |
| 3,357,639 | 12/1917 | Peterson | 238/14 |
| 3,708,117 | 1/1973 | Coale | 238/14 |
| 3,918,638 | 11/1975 | Nelson | 238/14 |
| 4,133,480 | 1/1979 | Granryd | 238/14 |

Primary Examiner—Richard A. Bertsch
Attorney, Agent, or Firm—August E. Roehrig, Jr.

[57] ABSTRACT

A vehicle traction device for passenger cars and alike including a flexible belt-like traction mat with transverse corrugations on one side and substantially smooth on the other side. One end of the mat is pivotally secured to anchoring means including a flexible anchoring pad and ground gripping element.

In use, the traction mat is first arranged to form a loop relative to the anchoring means. With its corrugations facing a tire and its smooth side facing the ground the traction mat will easily be drawn under a spinning wheel until that end of it, which is secured to the anchoring means becomes choked by the anchoring means. The tractive effort then developed causes the anchoring means to become wedged and thus assuring its fixed position, whereby the traction mat is prevented from being propelled away by the driven wheel.

11 Claims, 7 Drawing Figures

LOW COST VEHICLE TRACTION DEVICE EMPLOYING PIVOTALLY MOUNTED ANCHORING MEANS

BACKGROUND OF THE INVENTION

This invention relates in general to auxilliary vehicle traction aid for rubber tired vehicles intended to be used in case such a vehicle lacks sufficient ground adhesion—due to snow, ice, etc.—to propel itself.

More specifically this invention relates to a traction aid having a belt like traction mat and an anchoring means pivotally connected thereto.

Prior art teaches numerous configurations for devices of this general kind; however most such comprise a great plurality of parts and / or require substantial tooling expenditures, factors which adversely affect their commercial acceptance.

SUMMARY OF THE INVENTION

It is, therefore, an object of this invention to improve upon traction aid for rubber tired vehicles.

Another object of this invention is to obtain a traction aid comprising few and low cost elements and requiring minimum of tooling expenditures for fabrication.

These and other objects are attained with the present invention wherein is provided readily available matting and anchoring means, arranged in novel combination to assure effective operation.

DESCRIPTION OF THE DRAWINGS

Further objects of the invention, together with additional features contributing thereto and advantages accruing therefrom, will be apparent from the following description of one embodiment of the invention when read in conjunction with the accompanying drawings wherein.

DESCRIPTION OF A PREFERRED EMBODIMENT

Figure 1:
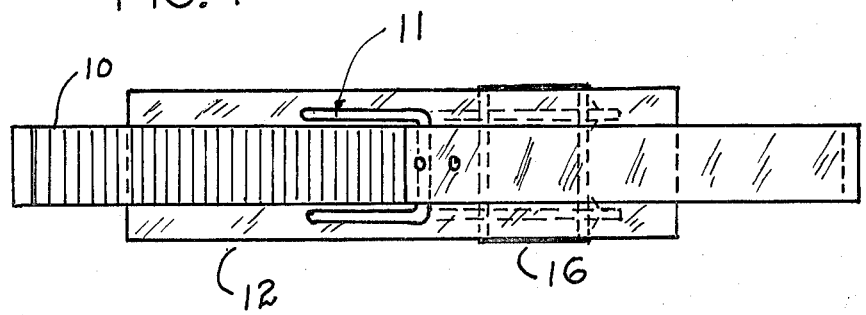
FIG. 1 is a top plan view of a traction aid as intended for a passenger car or alike.
Figure 2:
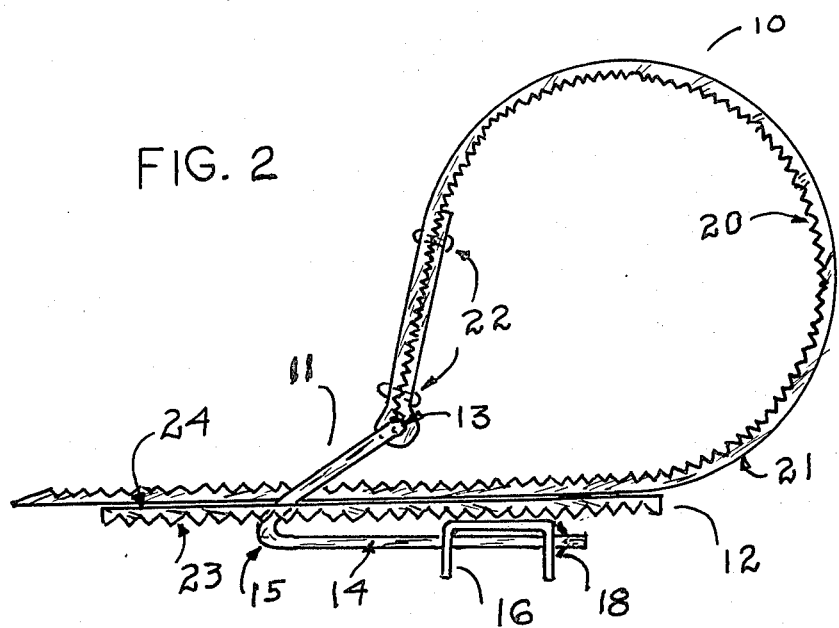
FIG. 2 is a side elevational view of the same device.
Figure 3:
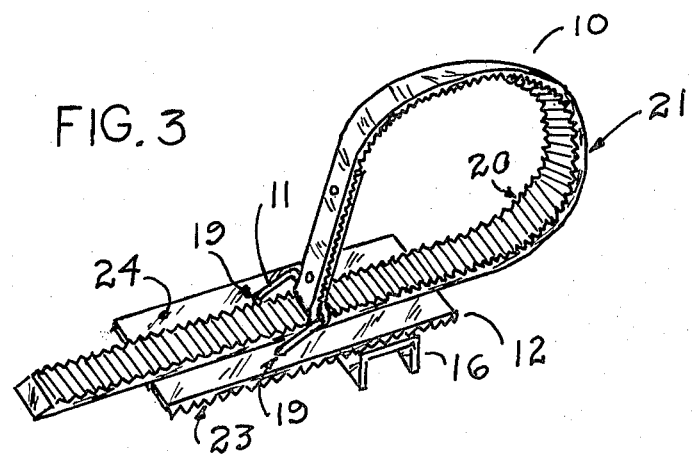
FIG. 3 is a perspective view of the device in position prior to use.
Figure 4:
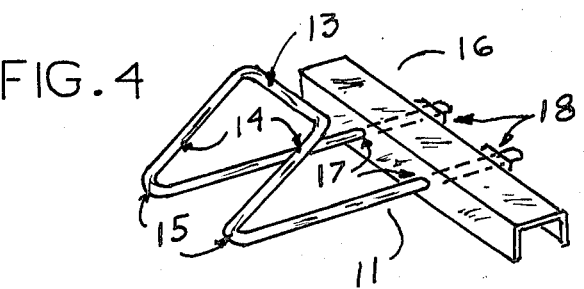
FIG. 4 is a fragmentary perspective view of frame and gripping means of the same device.

Referring first to FIGS. 1 and 2 there is shown a traction mat 10 rotatably mounted at its one end onto an anchoring frame 11. The configuration of frame 11 is best shown in FIG. 4. Also fastened to frame 11 is an anchoring pad 12 shown in FIGS. 1, 2 and 3.

Referring to FIG. 4—in which the pad 12 omitted for clarity—there is shown frame 11 and ground gripping element 16 secured thereto. Frame 11, formed from round stock spring steel, has a lateral portion 13 and two parallel portions 14, each having an acute bend 15. Gripping element 16, comprising a bar of commercially available steel U-channel, is provided with holes 17, through which the two portions 14 of frame 11 are inserted. Element 16 is securely fastened to portions 14 by push-on type spring nuts 18, a fastener frequently utilized in industry.

Referring again to FIGS. 1, 2 and 3—in assembly of the device anchor pad 12, having holes 19, is slid onto frame 11 to the bend 15 prior to installing gripping element 16. Traction mat 10, rotatably mounted at its one end, not numerated, to lateral portion 13 of frame 11 by means of rivets 22, comprises a strap of rubber type belting. It has transverse corrugations on its one side, 20, while substantially smooth on its other side, 21. Such belting is readily commercially available and used in conveyer belts, automotive timing belts etc. The width of mat 10 is such that it is narrower than the inner distance between the portions 14 of frame 11, allowing free movement there between. For proper functioning mat 10 is less than the tread width of a tire and it has been found that it performs satisfactorily even at a width as small as two inches. The length of mat 10 is such that it will comfortably extend under the full length of tire foot print of a mired wheel.

Anchoring pad 12, likewise to mat 10, comprises the same type of material, and having transverse corrugations on its lower side 23 and being substantially smooth on its upper side 24. Its width is greater than that of mat 10 to accomodate for its fastening to frame 11 and to provide surface area for anchoring. Its maximum width, as is the length of gripping element 16, is restricted by practical considerations only.

From the foregoing description the device comprises only four main components: mat 10, frame 11, pad 12 and gripping element 16 all of which are obtained from low cost, commercial hardware.

Figure 5A:
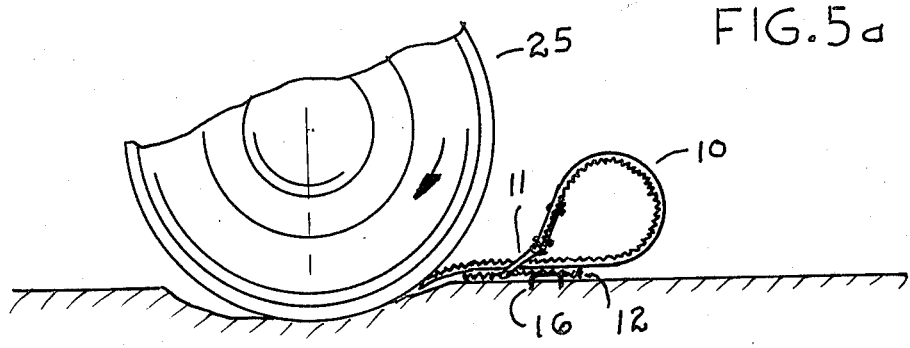
FIGS. 5a, 5b, 5c are side elevational views of the device illustrating sequence of events while in operation.
Figure 5B:
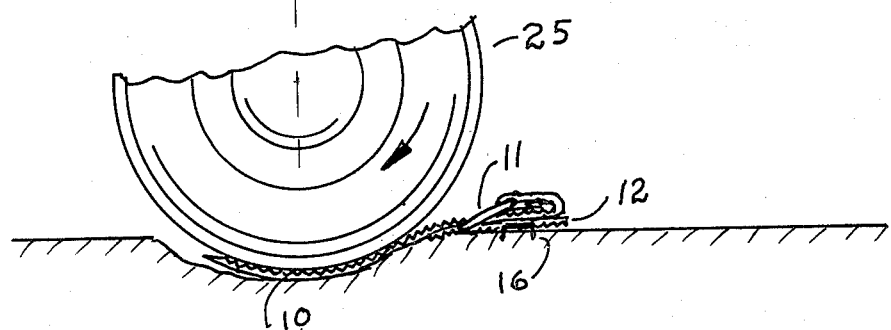
Figure 5C:
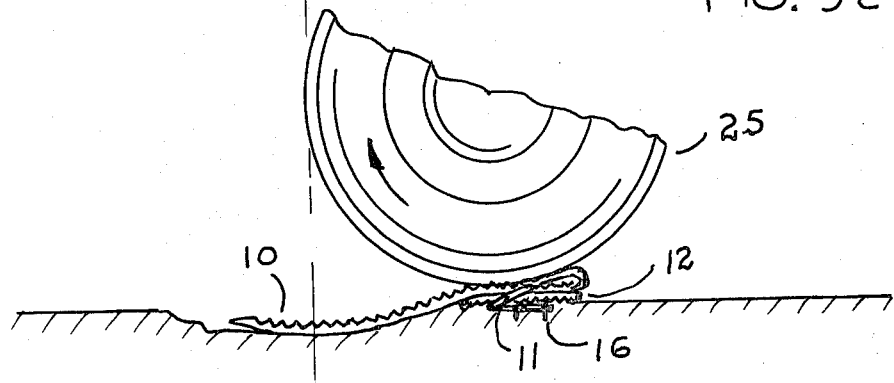

The operation of the device is shown in FIGS. 5a, 5b and 5c and illustrated in conjunction with a driving tire 25. It should be noted that most generally the device is used in pair, one placed by each of two driving wheels.

In FIG. 5a the device is shown placed on that side of a mired wheel, toward which the wheel is to be moved. With the device in configuration as shown in FIGS. 2 and 3—the free end of mat 10 is pushed into contact with tread of tire 25 and pad 12 is placed adjacently as shown in FIG. 5a. The loop like configuration of mat 10 is caused by it being constrained; in its relaxed state the mat 10 will be flat or take on a larger radius of curvature. Thus it will offer no resistance to be straightened as when drawn under the tire 25 as it begins to rotate. Contributing further to engagement of mat 10 toward under the tire 25 are the smooth surfaces 21 and 24 of mat 10 and pad 12 respectively.

FIG. 5b shows how the loop like configuration of mat 10 has disappeared; as the tire 25 has begun to rotate, and thus the rotatably mounted end of mat 10 has been choked against the pad 12. At this phase, the pad 12, the frame 11 and the gripping element 16 has begun to experience strain, causing an initial anchoring force.

As the tractive effort, created by the rotating tire 25 and the corrugated surface 20 of mat 10, continues—the choked end of mat 10, the anchoring pad 12, the frame 11 and the gripping element 16 become increasingly wedged between the tire 25 and the ground. Eventually, tire 25 will pass onto these means, thrusting them further into the ground as shown in FIG. 5c. As this phase is reached secure anchoring of new footing has been attained, thus assuring that tire 25 is being moved from its predicament.

While the invention has been described with reference to a preferred embodiment, it will be understood by those skilled in the art that various changes may be made and equivalents may be substituted for elements thereof without departing from the scope of the invention.

What is claimed is:

1. A device for providing a traction surface under the drive wheel of a vehicle comprising frame means adapted to be positioned adjacent to drive wheel of a vehicle, said frame means including gripping means to anchor said frame means to the surface supporting the drive wheel of the vehicle, said frame means further including mounting means disposed vertically above said gripping means, elongated flexible traction means having a first end portion pivotally coupled to said mounting means, said elongated flexible traction means having a second end portion adapted to be positioned adjacent the drive wheel of the vehicle between the drive wheel and said frame means, said elongated flexible traction means being looped past said gripping means and said mounting means during positioning of said second end portion adjacent the drive wheel, and said elongated flexible traction means forming a traction surface as said end portion is drawn beneath the drive wheel of the vehicle during rotation thereof while said first end portion is anchored against movement by said frame means.

2. A device of claim 1 wherein said elongated flexible traction means includes a belt fabricated from an elastomeric material.

3. A device of claim 1 wherein said elongated flexible traction means includes an elastomeric belt having an upper surface formed with a friction enhancing texture and a lower surface formed with a substantially smooth texture.

4. The device of claim 3 wherein said friction enhancing texture is formed by transverse corrugations.

5. A device of claim 1 wherein said frame means further includes an anchoring pad secured thereto, said anchoring pad having an upper surface to cooperate with said elongated flexible traction means and a lower surface to contact said gripping means.

6. A device of claim 5 wherein said anchoring pad includes a belt fabricated from an elastomeric material and said upper surface having a substantially smooth texture and said lower surface having a friction enhancing texture.

7. A device of claim 6 wherein said friction enhancing texture of said anchoring pad is formed by corrugations.

8. A device of claim 1 wherein said frame means is formed from a spring steel material.

9. A device of claim 1 wherein said gripping means includes bar means having at least one substantially sharp edge.

10. A device of claim 9 wherein said bar means is transversely secured to said lower portion of said frame means.

11. A device of claim 9 wherein said bar means is made from a steel material.